United States Patent
Liu et al.

(10) Patent No.: US 11,620,839 B2
(45) Date of Patent: Apr. 4, 2023

(54) SYSTEMS AND METHODS FOR DETECTING TEXT IN IMAGES

(71) Applicant: Walmart Apollo, LLC, Bentonville, AR (US)

(72) Inventors: Haining Liu, Dallas, TX (US); Feiyun Zhu, Arlington, TX (US); Jon Hammer, Frisco, TX (US); Ryan B. Reagan, Fort Worth, TX (US); Pingjian Yu, Plano, TX (US); Zhichun Xiao, Plano, TX (US); Yuqi Zhang, Dallas, TX (US); Yao Liu, Richardson, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 222 days.

(21) Appl. No.: 17/097,734

(22) Filed: Nov. 13, 2020

(65) Prior Publication Data

US 2021/0150245 A1 May 20, 2021

Related U.S. Application Data

(60) Provisional application No. 62/935,403, filed on Nov. 14, 2019.

(51) Int. Cl.
| | | |
|---|---|---|
| *G06K 9/62* | (2022.01) | |
| *G06V 20/62* | (2022.01) | |
| *G06V 10/56* | (2022.01) | |
| *G06V 30/10* | (2022.01) | |

(52) U.S. Cl.
CPC .......... *G06V 20/62* (2022.01); *G06K 9/6201* (2013.01); *G06V 10/56* (2022.01); *G06V 30/10* (2022.01)

(58) Field of Classification Search
CPC ........ G06V 20/62; G06V 10/56; G06V 30/10; G06V 30/18105; G06K 9/6201
USPC ......................................................... 382/103
See application file for complete search history.

(56) References Cited

U.S. PATENT DOCUMENTS

| | | | |
|---|---|---|---|
| 6,105,866 A | 8/2000 | Morrison | |
| 8,587,685 B2* | 11/2013 | Ahn | G06V 20/63 348/222.1 |
| 9,218,580 B2 | 12/2015 | Libal | |
| 10,339,595 B2 | 7/2019 | Glaser | |
| 10,380,855 B2 | 8/2019 | Lobo | |

(Continued)

*Primary Examiner* — Ali Bayat
(74) *Attorney, Agent, or Firm* — Fitch, Even, Tabin & Flannery, LLP

(57) ABSTRACT

In some embodiments, apparatuses and methods are provided herein useful to detecting text in images. In some embodiments, a system for detecting text in images comprises a database configured to store images and a control circuit configured to retrieve an image, generate, based on the image, a collection of augmented images, detect characters in each of the augmented images, generate bounding boxes for the characters in each of augmented images, recognize the characters in each of the augmented images, select, based on the recognition of the characters in each of the augmented images, candidate characters, wherein the candidate characters are selected based on consistency of the recognition of the characters in each of the augmented images, detect, for the image, a color associated with the characters, and store, in the database, the image, the candidate characters, and the color associated with the characters.

16 Claims, 3 Drawing Sheets

(56) References Cited

U.S. PATENT DOCUMENTS

| | | | |
|---|---|---|---|
| 2013/0085893 A1* | 4/2013 | Bhardwaj | G06V 10/507 |
| | | | 705/26.62 |
| 2014/0111542 A1* | 4/2014 | Wan | G06V 10/7788 |
| | | | 345/633 |
| 2018/0260612 A1 | 9/2018 | Richards | |
| 2019/0149725 A1* | 5/2019 | Adato | G06V 20/17 |
| | | | 348/158 |
| 2019/0215424 A1* | 7/2019 | Adato | G06V 40/10 |
| 2020/0273013 A1* | 8/2020 | Garner | G06Q 10/087 |
| 2020/0368616 A1* | 11/2020 | Delamont | A63F 13/213 |

* cited by examiner

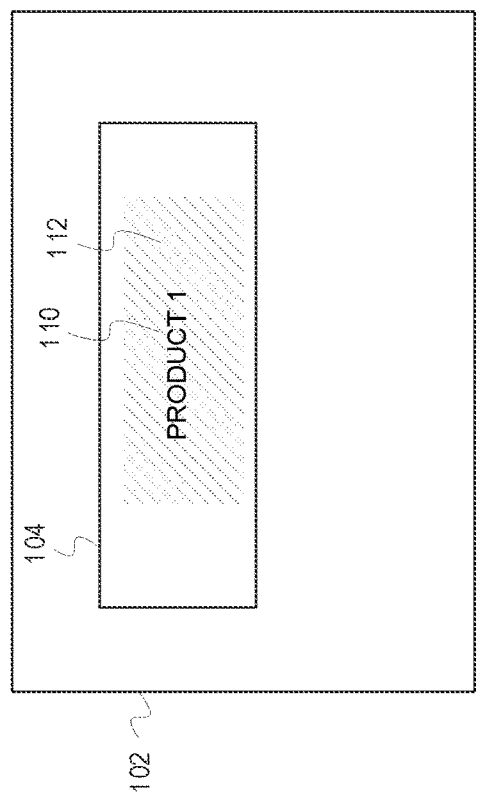
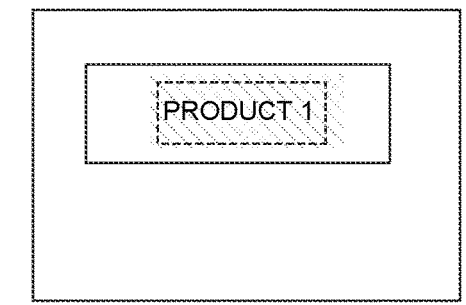
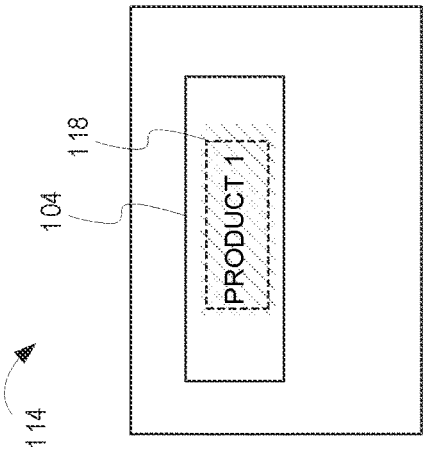
FIG. 1A
FIG. 1B

SYSTEMS AND METHODS FOR DETECTING TEXT IN IMAGES

CROSS-REFERENCE TO RELATED APPLICATION

This application claims the benefit of U.S. Provisional Application No. 62/935,403, filed Nov. 14, 2019, which is incorporated by reference in its entirety herein.

TECHNICAL FIELD

This invention relates generally to text recognition and, more specifically, text recognition in images.

BACKGROUND

As technology advances, machine learning is becoming increasingly common. Often, machine learning is used to analyze data that would otherwise be analyzed by a human user. For example, machine learning can be used to identify text in images. However, while machine learning can be used to decrease human involvement, the machine learning models are typically trained using data analyzed by human users. This human analysis of data to train the machine learning models can be quite expensive and time consuming, slowing the progress of machine learning models. Accordingly, a need exists for systems, methods, and apparatuses that further remove, or minimize, the need for human involvement in training learning models.

BRIEF DESCRIPTION OF THE DRAWINGS

Disclosed herein are embodiments of systems, apparatuses, and methods pertaining to detecting text in images. This description includes drawings, wherein:

FIG. 1A depicts an image 102 including a product 104, according to some embodiments;

FIG. 1B depicts a series of augmented images 114 based on the image of FIG. 1A, according to some embodiments;

Figure 2:
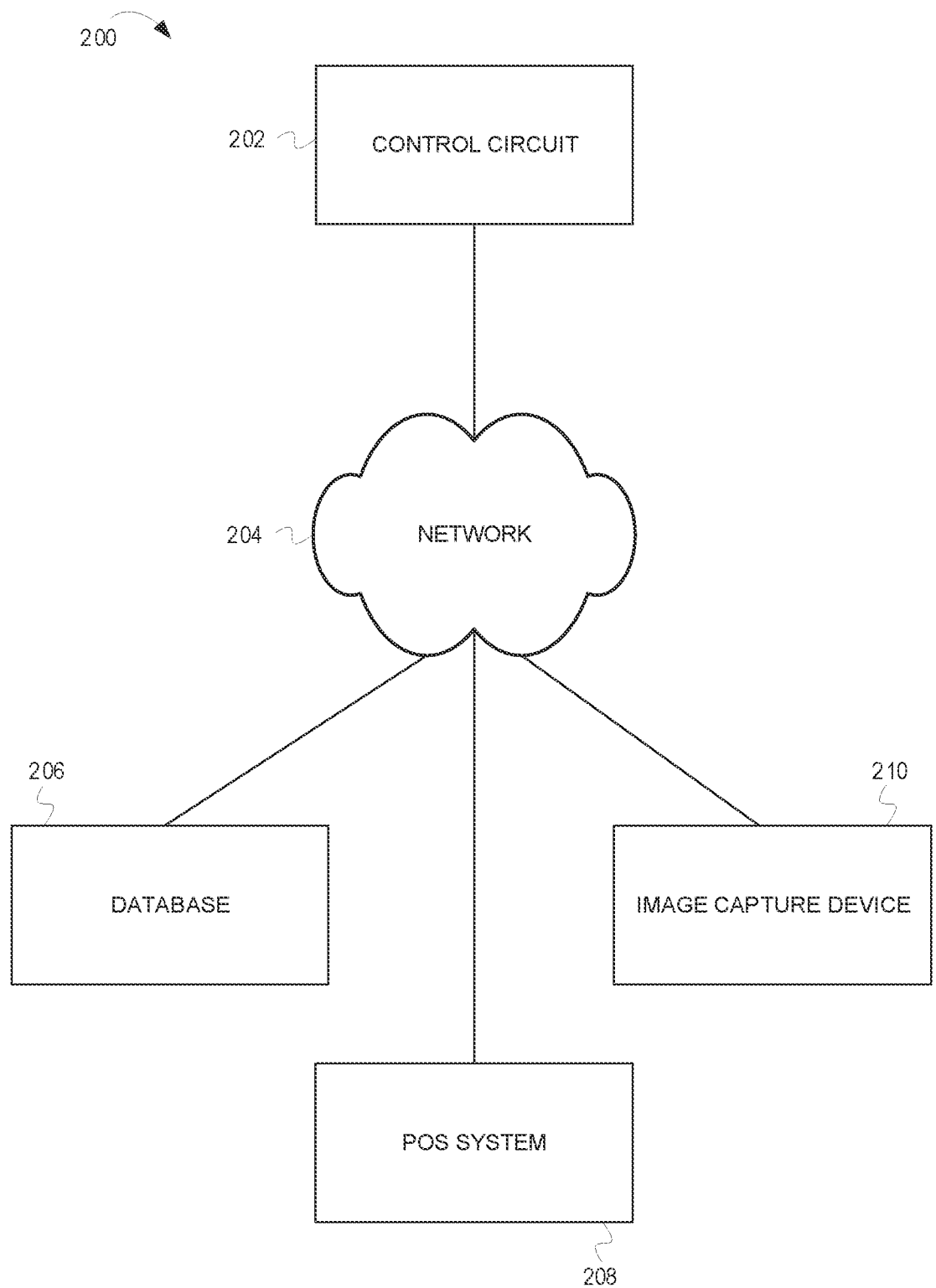
FIG. 2. is a block diagram of a system 200 for detecting text in images, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to detecting text in images. In some embodiments, a system for detecting text in images comprises a database, wherein the database is configured to store images and a control circuit, wherein the control circuit is communicatively coupled to the database, and wherein the control circuit is configured to retrieve, from the database, an image, generate, based on the image, a collection of augmented images, detect words and characters in each image of the collection of augmented images, generate bounding boxes for the words and characters in each of the images of the collection of augmented images, recognize the characters in each of the images of the collection of augmented images, select, based on the recognition of the characters in each of the images of the collection of augmented images, candidate characters, wherein the candidate characters are selected based on consistency of the recognition of the characters in each of the images of the collection of augmented images, detect, for the image, a color associated with the characters, and store, in the database, the image, the candidate characters, and the color associated with the characters.

As previously discussed, machine learning algorithms can be used to analyze information that human users would typically analyze. As one example, machine learning can be used to recognize text in images. However, in order to recognize text in images, the machine learning models must be trained. Machine learning models are typically trained using text data sets that have been compiled by human users. For example, in a text recognition system, human users analyze images and record what, if any, text appears within the image. The machine learning model is then trained using these human-analyzed images. Unfortunately, using human users to analyze images is expensive and time consuming. In fact, human analysis of images can be so expensive and/or time consuming that it prevents the expansion of machine learning into new fields or inhibits groups from employing machine learning. Described herein are systems, methods, and apparatuses that seek to minimize, if not eliminate, the need for human users to analyze text in images to train leaning models.

In one embodiment, a system automatically analyzes images to detect text in the images. The automatically analyzed images are used to train a learning model. In an effort to increase the number of images, and confidence with which a machine learning model can identify text in an image, the system analyzes a collection of augmented images. The system generates the augmented images based on a base image. For example, the system can rotate, distort, recolor, etc. the base image to generate an augmented image. The system detects characters and generates bounding boxes around the words and characters in each of the augmented images. The system then recognizes the characters in each of the augmented images and reconciles the recognized characters between the augmented images. In some embodiments, the system also detects color associated with the characters. The analyzed images are used to train a machine learning model. It should be noted that initially, in some embodiments, the system can use synthesized annotated images or existing small scale image sets to train a low capacity model. In such embodiments, the system can use this low capacity model to detect the words and characters. The model is then further trained to improve performance and/or accuracy based on the augmented images. The discussion of FIGS. 1A-1B provides an overview of such a system.

FIG. 1A depicts an image 102 including a product 104, according to some embodiments. For example, the image 102 can be of the product 104 on a product display unit, in a delivery vehicle, on a pallet, in a cart, etc. The product 104 includes text 110 (e.g., a product name, a product identifier (e.g., a SKU), a brand name, etc.). The product 104 also includes color 112 (e.g., on the product's 104 packaging, in the brand name, of the characters, etc.). Though the image 102 depicted in FIG. 1 includes only one product (i.e., the product 104), embodiments are not so limited. That is, an image can include multiple products. As previously discussed, the system augments images and analyzes the augmented images.

FIG. 1B depicts a series of augmented images 114 based on the image 102 of FIG. 1A, according to some embodiments. To a certain extent, the accuracy with which a machine learning model can perform a task, in this example detect text in images, is based on the data set with which the learning model is trained. The richer the data set, the more accurate the machine learning model. To this end, it is often a goal to use a large data set that is well annotated (e.g., with indications of the characters in the images of the data set). The systems, methods, and apparatuses described herein seek to achieve this goal by annotating each base image by combining the annotation results of multiple augmented images from the base image used for the data set. That is, the image 102 of FIG. 1A is augmented to create the augmented images 114 (i.e., images that are based on the image 102 of FIG. 1A). The system creates the augmented images by altering qualities, properties, aspects, etc. of the image 102 of FIG. 1A. For example, the system can generate the augmented images 114 by adjusting the color of the image 102 (e.g., making the image 102 grayscale, enhancing the colors, inverting the colors, changing the colors, etc.), adjusting noise of the image 102, adjusting sharpness of the image 102, rotating the image 102 (e.g., about an axis, mirroring, etc.), cropping the image 102, resizing the image 102 (e.g., making the image 102 larger or smaller), etc. As depicted in FIG. 1B, the augmented images 114 are instances of the image 102 rotated to different orientations.

Because the augmented images are based on the image 102, the augmented images 114 include the product 104. It should be noted, however, that such is not required. For example, if an augmented image is generated by cropping an image (e.g., an image that includes multiple products), one or more of the products in the image may be cropped out of the image. The system analyzes all of the augmented images to detect characters in the augmented images. The system also generates bounding boxes 118 around the characters. The system then recognizes the characters in each of the augmented images 114 and reconciles the recognized characters. For example, the system can select from the characters recognized in each of the augmented images 114 based on the consistency of the characters across the augmented images 114. For example, if the characters on a product are "TEST," the system may recognize the character "T" as a "T," an "I," of an "L." If the system recognizes the character "T" as a "T" in 73% of the augmented images 114, as an "I" in 18% of the images, and as an "L" in 9% of the images, the system can reconcile the character "T" as a "T" based on the consistency of the recognition across the augmented images 114. In this example, the reconciliation of the character "T" as a "T" would be the selection "T" as a candidate character for the first character of the word "TEST."

In addition to recognizing characters, in some embodiments, the system also recognizes colors (e.g., on product packaging, in a region near the detected words/characters, etc.). If the use case is to recognize products in an image, color can be used in many ways to make the recognition more accurate and/or faster. For example, if a database of products includes both characters associated with products and colors associated with products, the system can use both detected colors and recognized characters to identify products. As another example, the system could eliminate all products that do not match the color before searching by character. Accordingly, in some embodiments, the system detects colors associated with the characters. The color can be associated with the characters and/or words in that the characters are a color, the characters are surrounded by or otherwise near one or more colors, a product's packaging includes colors, etc.

The system stores the candidate characters and/or the color(s) associated with the characters in a database along with the image 102. The images, candidate characters, and color(s) associated with the candidate colors are used to train a machine learning model. In some embodiments, the images, candidate characters, and color(s) associated with the characters can be used to analyze images to identify products, as discussed in greater detail herein.

While the discussion of FIGS. 1A and 1B provide background information regarding a system for detecting text in images, the discussion of FIG. 2 provides additional detail regarding such a system.

FIG. 2 is a block diagram of a system 200 for detecting text in images, according to some embodiments. The system 200 includes a control circuit 202, a database 206, a point-of-sale (POS) system 208, and an image capture device 210. One or more of the control circuit 202, database 206, POS system 208, and image capture device 210 are communicatively coupled via a network 204. The network 204 can be a local area network (LAN) and/or wide area network (WAN), such as the Internet, and include wired and/or wireless links.

The database 206 is configured to store images. Accordingly, the database 206 can be of any suitable type. Additionally, in some embodiments, the database 206 can store the candidate characters for the images and/or the color associated with the characters. The images, and in some embodiments that candidate characters for the images and/or the color associated with the characters, are used to train machine learning model for detecting text in images.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

Generally, the control circuit 202 generates the candidate characters for the images. Additionally, in some embodiments, the control circuit 202 generates indications of colors associated with the characters. The candidate characters and, in some embodiments, the indications of the colors associated with the characters, are used to train a leaning model. The control circuit 202 retrieves an image from the database 206. The control circuit 202 augments the image, creating multiple images based on the image. For example, the control circuit 202 can augment the image (i.e., generate augmented images) by adjusting the color of the image (e.g., making the image grayscale, enhancing the colors, inverting the colors, changing the colors, etc.), adjusting noise of the image, adjusting sharpness of the image, rotating the image (e.g., about an axis, mirroring, etc.), cropping the image, resizing the image (e.g., making the image larger or smaller), etc. The augmented images allow the control circuit 202 to recognize characters in a number of images, as opposed to only in the base image. The control circuit 202 can reconcile the recognized characters of the augmented images to increase the accuracy with which the characters are recognized. Because the augmented images are based on the same image, the augmented images should include at least some of the same characters.

After recognizing the characters, the control circuit 202 reconciles the recognized characters from the augmented images by selecting candidate characters based on the recognition of the characters in the augmented images. For example, the control circuit 202 can select the candidate characters based on the consistency of the characters recognized between the augmented images. The control circuit 202 stores an indication of the candidate characters in the database 206.

The control circuit 202 also detects color in the image. The color is associated with the words. The color is associated with the characters in that the color appears on the same product as the words. For example, the words and/or color may be part of a logo for the product (e.g., a brand, an insignia, product packaging, a symbol, etc. associated with a product). The control circuit 202 stores the color (e.g., an indication of the color) associated with the words in the database 206.

As previously discussed, the images, candidate characters, and colors associated with the colors can be used to train a learning model. Additionally, in some embodiments, the images, candidate characters, and/or colors can be used to detect text (e.g., identify, locate, and/or recognize) characters in images provided by an image capture device 210. That is, the system 200 can be used not only to generate a data set for use in training the machine learning model, but can also be used to apply the machine learning model to "real world" data for analysis. Though the system 200 can be configured to recognize text in any type of image, the following discussion relates to a retail embodiment. In a retail use case, the image can include products located, for example, in a cart. The image capture device 210 captures images of the cart including the products. As one example, the image capture device 210 can be located at or near a point-of-sale (POS) system 208. In this example, the image capture device 210 can capture images of customers' carts as the customers checkout at the POS system (e.g., a POS terminal). The text on the products can be used to identify the products in the cart. The products can be identified for inventory purposes, automated checkout purposes, shrink reduction, confirmation of product placement, etc.

In a first use case, the control circuit 202 receives an image from the image capture device 210. The control circuit 202 detects characters on a product in the image and color associated with the characters in the image. The control circuit 202 performs character recognition (e.g., based on a machine learning model, optical character recognition (OCR), an item detection model, etc.). The control circuit 202 then accesses the database 206 to determine a logo that includes the characters on the product in the image. The control circuit 202 further accesses the database to determine a color associated with the logo. That is, the control circuit 202 identifies the product using the recognized words and characters, and verifies that the identified product includes the colors detected.

In a second use case, the control circuit 202 receives an image from the image capture device 210. The control circuit 202 detects words on a product in the image and color associated with the characters in the image. The control circuit 202 then accesses the database 206 to determine candidate logos (i.e., logos that match the color associated with the words on the product in the image). For example, if the color in the image is orange, the control circuit 202 will select all orange logos as the candidate logos. This narrows the possibilities or products based on the color of the logo. The control circuit 202 recognizes the characters and selects, from the narrowed possibilities of products, a type of the product in the image.

Figure 3:
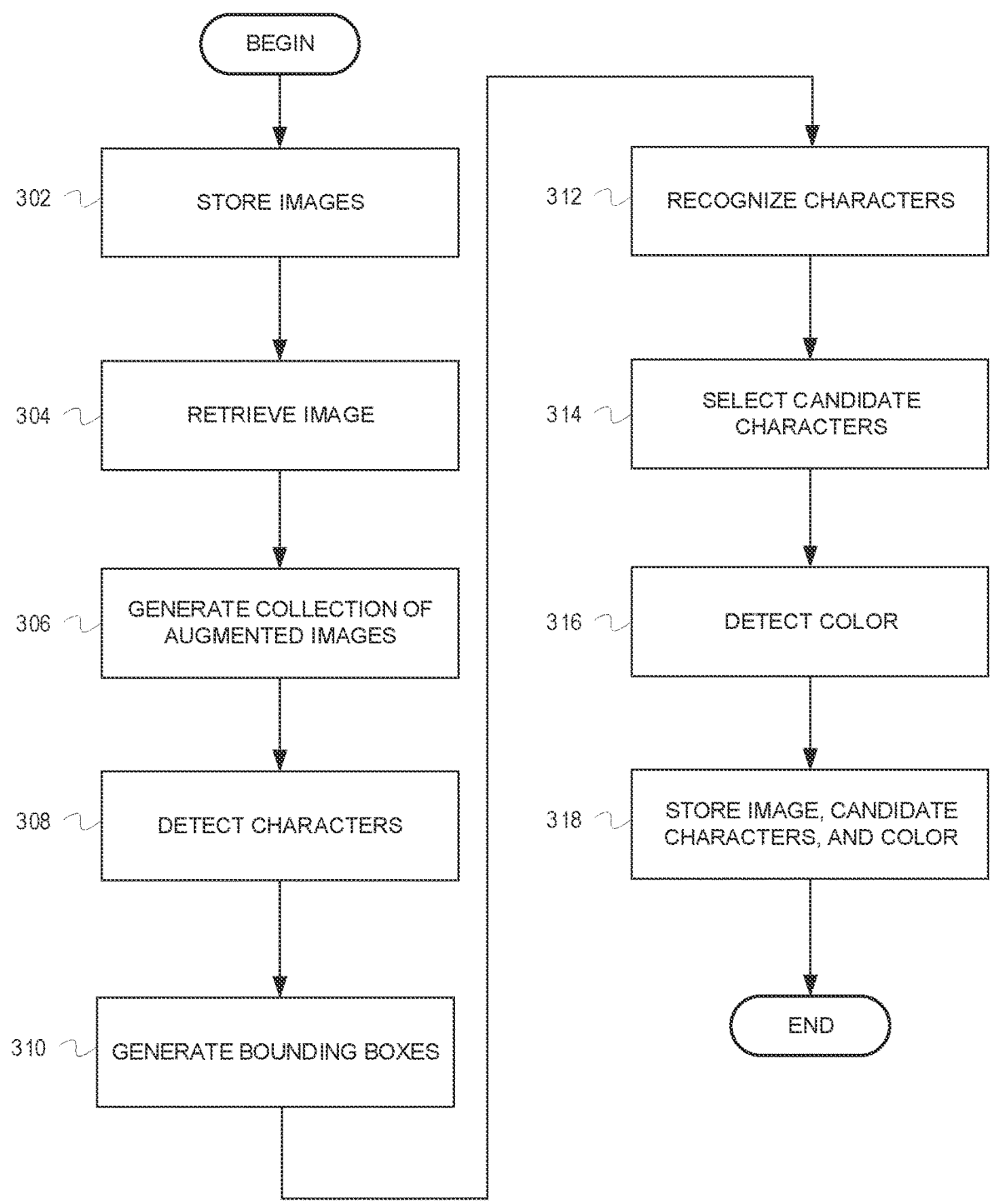
FIG. 3 is a flow chart including example operations for detecting text in images, according to some embodiments.

While the discussion of FIG. 2 provides additional details regarding a system for detecting text in images, the discussion of FIG. 3 describes example operations of such a system.

FIG. 3 is a flow chart including example operations for detecting text in images, according to some embodiments. The flow begins at block 302.

At block 302, images are stored. For example, a database can store the images. The images, as well as candidate characters and indications of color, can be used to train a machine learning model. In some embodiments, the images, as well as the candidate characters and the indications of color, can be used by the machine learning model to identify text in images. The flow continues at block 304.

At block 304, an image is retrieved. For example, a control circuit can retrieve the image from a database. The flow continues at block 306.

At block 306, a collection of augmented images is generated. For example, the control circuit can generate the collection of augmented images based on the retrieved image. The augmented images are used to identify candidate characters. The augmented images are modified, adjusted, etc. versions of the image to use as additional images and/or comparison images. The control circuit augments the image by, for example adjusting the color of the image (e.g., making the image grayscale, enhancing the colors, inverting the colors, changing the colors, etc.), adjusting noise of the image, adjusting sharpness of the image, rotating the image (e.g., about an axis, mirroring, etc.), cropping the image, resizing the image (e.g., making the image larger or smaller), etc. The control circuit can generate as many, or as few, augmented images for the collection of augmented images as desired. For example, the control circuit can generate five, 10, 20, 50, 100, 1,000, 10,000, etc. augmented images based on the image. The flow continues at block 308.

At block 308, characters are detected. For example, the control circuit can detect characters. The control circuit detects characters in each of the augmented images (i.e., in each of image of the collection of augmented images). The control circuit can detect the characters based on any suitable technique and/or algorithm. The characters are located on the product. For example, the characters can be located on part of the product, packaging for the product, items associated with the products, etc. The characters can be a brand name, a description of a product, a type of a product, a product identifier, etc. Detection of the characters can include detection of actual character and/or the detection of a presence of a word. For example, the control circuit may "detect characters" in that the control circuit detects the presence of a word in the image, but does not detect the individual characters. In such embodiments, the detection and/or recognition of the characters in the words may not occur until after a verification of color, as described in greater detail herein. In one embodiment, synthesized annotated images are used to train two models: 1) a word detection model; and 2) a character detection and recognition model. These models can, for example, be instance detection models such as YOLO v3. The word detection model detects the locations of words so that bounding boxes can be generated for the words (as described with respect to block 310). The flow continues at block 310.

At block 310, bounding boxes are generated. For example, the control circuit can generate the bounding boxes. The control circuit can generate the bounding boxes around the detected characters. For example, the control circuit can generate the bounding boxes based on a coordinate system such that the words are included within the bounding boxes. In some embodiments, the bounding boxes (i.e., the portion of the image contained by the bounding box) is extracted from the image for character recognition. The control circuit generates bounding boxes around the characters in each of the augmented images. The flow continues at block 312.

At block 312, characters are recognized. For example, the control circuit can recognize the characters. The control circuit recognizes the characters in each of the augmented images. The control circuit can recognize the characters based on any suitable technique and/or algorithm. For example, the control circuit can recognize the characters based on OCR, an item detection model (e.g., YOLO v3 or Faster RCNN Model), etc. The flow continues at block 314.

At block 314, candidate characters are selected. For example, the control circuit can select the candidate characters. The control circuit selects the candidate characters from amongst the characters recognized in each of the augmented images. In some embodiments, the control circuit selects the candidate characters based on the consistency of the characters across the augmented images. As one example, assume that the image includes only one character. The control circuit can select as the candidate character whatever the single character was recognized as most frequently in the augmented images. The flow continues at block 316.

At block 316, color is detected. For example, the control circuit can detect the color. The control circuit detects the color in the image. In one embodiment, the control circuit detects the color associated with the product. The control circuit can detect a single color or multiple colors. In one embodiment, the control circuit detects multiple colors and generates a color histogram. The color histogram represents the percentage of the product packaging (or other color region) is comprised of each color. The flow continues at block 318.

At block 318, the images, candidate characters, and colors are stored. For example, the control circuit can store the images, candidate characters, and colors in the database. The images, candidate characters, and colors can be used to train a machine learning model. Additionally, in some embodiments, the machine learning model can be used to detect text in images.

In some embodiments, a system for detecting text in images comprises a database, wherein the database is configured to store images and a control circuit, wherein the control circuit is communicatively coupled to the database, and wherein the control circuit is configured to retrieve, from the database, an image, generate, based on the image, a collection of augmented images, detect characters in each image of the collection of augmented images, generate bounding boxes for the characters in each of the images of the collection of augmented images, recognize the characters in each of the images of the collection of augmented images, select, based on the recognition of the characters in each of the images of the collection of augmented images, candidate characters, wherein the candidate characters are selected based on consistency of the recognition of the characters in each of the images of the collection of augmented images, detect, for the image, a color associated with the characters, and store, in the database, the image, the candidate characters, and the color associated with the characters.

In some embodiments, an apparatus and a corresponding method performed by the apparatus comprises storing, in a database, images, retrieving, by a control circuit from the database, an image, generating, by the control circuit based on the image, a collection of augmented images, detecting, by the control circuit, characters in each of the images of the collection of augmented images, generating, by the control circuit, bounding boxes for the characters in each of the images of the collection of augmented images, recognizing, by the control circuit, the characters in each of the images of the collection of augmented images, selecting, by the control circuit based on the recognition of the characters in each of the images of the collection of augmented images, candidate characters, wherein the candidate characters are selected based on consistency of the recognition of the characters in each of the images of the collection of augmented images, detecting, by the control circuit for the image, a color associated with the characters, and storing, in the database, the image, the candidate characters, and the color associated with the characters.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for detecting text in images, the system comprising:
   a database, wherein the database is configured to store images; and a control circuit, wherein the control circuit is communicatively coupled to the database, and wherein the control circuit is configured to:
retrieve, from the database, an image;
generate, based on the image, a collection of augmented images;
detect characters in each of the images of the collection of augmented images;
generate bounding boxes for the characters in each of the images of the collection of augmented images;
recognize the characters in each of the images of the collection of augmented images;
select, based on the recognition of the characters in each of the images of the collection of augmented images, candidate characters, wherein the candidate characters are selected based on consistency of the recognition of the characters in each of the images of the collection of augmented images;
detect, for the image, a color associated with the characters;
store, in the database, the image, the candidate characters, and the color associated with the characters; and
an image capture device, wherein the image capture device is configured to capture images of carts, and wherein the control circuit is further configured to:
receive one of the images of the carts;
detect characters on a product in the one of the images;
detect a color associated with the characters on the product in the one of the images;
recognize the characters on the product in the one of the images;
determine, based on accessing the database, a logo including the characters on the product in the one of the images;
determine, based on accessing the database, a color associated with the logo; and
verify the recognition of the characters on the product in the one of the images based on a matching of the color associated with the characters on the product in the one of the images and the color associated with the logo.

2. The system of claim 1, wherein the logo includes one or more of a brand, an insignia, product packaging, and a symbol.

3. The system of claim 1, wherein the database is further configured to store a data set based on the recognized characters.

4. The system of claim 1, wherein the color associated with the characters is one or more of a color of the characters, a background color for the characters, color histogram within a bounding box, and a color within the bounding box.

5. The system of claim 1, wherein the control circuit recognizes the characters in each of the images of the collection of augmented images based on one or more of optical character recognition (OCR) and an item detection model.

6. The system of claim 1, wherein the collection of augmented images includes at least 50 images.

7. A system for detecting text in images, the system comprising:
a database, wherein the database is configured to store images;
a control circuit, wherein the control circuit is communicatively coupled to the database, and wherein the control circuit is configured to:
retrieve, from the database, an image;
generate, based on the image, a collection of augmented images;
detect characters in each of the images of the collection of augmented images;
generate bounding boxes for the characters in each of the images of the collection of augmented images;
recognize the characters in each of the images of the collection of augmented images;
select, based on the recognition of the characters in each of the images of the collection of augmented images, candidate characters, wherein the candidate characters are selected based on consistency of the recognition of the characters in each of the images of the collection of augmented images;
detect, for the image, a color associated with the characters;
store, in the database, the image, the candidate characters, and the color associated with the characters; and
an image capture device, wherein the image capture device is configured to capture images of carts, and wherein the control circuit is further configured to:
receive one of the images of the carts;
detect characters on a product in the one of the images;
detect a color associated with the characters on the product in the one of the images;
determine, based on accessing the database, a list of candidate logos, wherein the candidate logos match the color associated with the characters on the product in the one of the images;
recognize at least one of the characters on the product in the one of the images; and
select, from the list of candidate logos based on the recognition of the at least one of the characters, a type of product for the product in the one of the images.

8. The system of claim 7, wherein the logo includes one or more of a brand, an insignia, product packaging, and a symbol.

9. A method for detecting text in images, the method comprising:
storing, in a database, images;
retrieving, by a control circuit from the database, an image;
generating, by the control circuit based on the image, a collection of augmented images;
detecting, by the control circuit, characters in each of the images of the collection of augmented images;
generating, by the control circuit, bounding boxes for the characters in each of the images of the collection of augmented images;
recognizing, by the control circuit, the characters in each of the images of the collection of augmented images;
selecting, by that control circuit based on the recognition of the characters in each of the images of the collection of augmented images, candidate characters, wherein the candidate characters are selected based on consistency of the recognition of the characters in each of the images of the collection of augmented images;
detecting, by the control circuit for the image, a color associated with the characters; and
storing, in the database, the image, the candidate characters, and the color associated with the characters;
capturing, by an image capture device, images of carts;
receiving, by the control circuit, one of the images of the carts;

detecting, by the control circuit, characters on a product in the one of the images;
recognizing, by the control circuit, the character on the product in the one of the images;
determining, by the control circuit based on accessing the database, a logo including the characters on the product in the one of the images;
determining, by the control circuit based on accessing the database, a color associated with the logo; and
verifying, by the control circuit, the recognition of the characters on the product in the one of the images based on a matching of the color associated with the characters on the product in the one of the images and the color associated with the logo.

10. The method of claim 9, wherein the logo includes one or more of a brand, an insignia, product packaging, and a symbol.

11. The method of claim 9, wherein the database is further configured to store a data set based on the recognized characters.

12. The method of claim 9, wherein the color associated with the characters is one or more of a color of the characters, a background color for the characters, a color histogram within a bounding box, and a color within the bounding box.

13. The method of claim 9, wherein the control circuit recognizes the characters in each of the images of the collection of augmented images based on one or more of optical character recognition (OCR) and an item detection model.

14. The method of claim 9, wherein the collection of augmented images includes at least 50 images.

15. A method for detecting text in images, the method comprising:
storing, in a database, images;
retrieving, by a control circuit from the database, an image;
generating, by the control circuit based on the image, a collection of augmented images;
detecting, by the control circuit, characters in each of the images of the collection of augmented images;
generating, by the control circuit, bounding boxes for the characters in each of the images of the collection of augmented images;
recognizing, by the control circuit, the characters in each of the images of the collection of augmented images;
selecting, by that control circuit based on the recognition of the characters in each of the images of the collection of augmented images, candidate characters, wherein the candidate characters are selected based on consistency of the recognition of the characters in each of the images of the collection of augmented images;
detecting, by the control circuit for the image, a color associated with the characters;
storing, in the database, the image, the candidate characters, and the color associated with the characters
capturing, by an image capture device, images of carts;
receiving, by the control circuit, one of the images of the carts;
detecting, by the control circuit, characters on a product in the one of the images;
detecting, by the control circuit, a color associated with the characters on the product in the one of the images;
determining, by the control circuit based on accessing the database, a list of candidate logos, wherein the candidate logos match the color associated with the characters on the product in the one of the images;
recognizing, by the control circuit, at least one of the characters on the product in the one of the images; and
selecting, from the list of candidate logos based on the recognition of the at least one of the characters, a type of product for the product in the one of the images.

16. The method of claim 15, wherein the logo includes one or more of a brand, an insignia, product packaging, and a symbol.

* * * * *